(12) United States Patent
Guard (10) Patent No.: US 7,578,264 B2
(45) Date of Patent: Aug. 25, 2009

(54) STACKABLE PET SHELTER

(75) Inventor: Tony M. Guard, Union, KY (US)

(73) Assignee: Gravity, Incorporated, Cincinnati, OH (US)

( * ) Notice: Subject to any disclaimer, the term of this patent is extended or adjusted under 35 U.S.C. 154(b) by 308 days.

(21) Appl. No.: 11/518,263

(22) Filed: Sep. 8, 2006

(65) Prior Publication Data

US 2007/0051323 A1 Mar. 8, 2007

Related U.S. Application Data

(60) Provisional application No. 60/714,914, filed on Sep. 8, 2005.

(51) Int. Cl.
*A01K 1/02* (2006.01)
*A01K 1/03* (2006.01)

(52) U.S. Cl. .................. 119/496; 119/482; 119/501

(58) Field of Classification Search ............. 119/496, 119/482, 28.5, 161, 165, 702, 416, 452, 498, 119/417, 453, 455, 483, 487, 490; 206/499, 206/503, 508, 509, 510
See application file for complete search history.

(56) References Cited

U.S. PATENT DOCUMENTS

| 3,524,431 A * | 8/1970 | Graham et al. ............. 119/496 |
| 4,161,924 A * | 7/1979 | Welker ...................... 119/482 |
| 4,301,766 A * | 11/1981 | Piccone ..................... 119/482 |
| 4,494,650 A * | 1/1985 | Cullen ..................... 206/315.9 |
| 4,723,512 A * | 2/1988 | Margolis ................... 119/455 |
| 4,846,109 A * | 7/1989 | Baer et al. ................. 119/496 |
| 5,186,122 A * | 2/1993 | Phillips et al. ............. 119/474 |
| 5,387,165 A * | 2/1995 | Warren ....................... 482/35 |
| 5,711,253 A * | 1/1998 | Phillips et al. ............. 119/706 |
| 5,713,302 A * | 2/1998 | Walter ....................... 119/165 |
| 5,791,293 A * | 8/1998 | Northrop et al. ........... 119/498 |
| 5,964,189 A * | 10/1999 | Northrop et al. ........... 119/482 |
| 6,298,808 B1* | 10/2001 | Crafton et al. ............. 119/165 |
| 6,397,782 B1* | 6/2002 | Cope et al. ................. 119/452 |
| 7,021,243 B2* | 4/2006 | Harper et al. .............. 119/498 |
| 7,134,404 B2* | 11/2006 | Slone ........................ 119/501 |
| 7,191,734 B2* | 3/2007 | Strzempko et al. ......... 119/496 |
| 2005/0028745 A1* | 2/2005 | Baillie et al. ............... 119/165 |

FOREIGN PATENT DOCUMENTS

| JP | 08023809 A * | 1/1996 |
| JP | 11169006 A * | 6/1999 |
| JP | 11255271 A * | 9/1999 |

* cited by examiner

*Primary Examiner*—Son T. Nguyen
(74) *Attorney, Agent, or Firm*—Haverstock Roberts LLP (57) ABSTRACT

A weather resistant portable pet shelter, including a rigid shell enclosing an interior space, the rigid shell including a lower base portion below the interior space having at least one external, downwardly facing element having a predetermined shape, a side wall portion extending at least substantially around the interior space and including a door opening connecting therewith, and an upper roof portion above the space and including a peripheral portion therearound having an external dish shaped structure defining an upwardly open concave region adapted for receiving and supporting a pet or a pet bed on the roof portion, the external dish shaped structure being configured for mating with and supporting the at least one downwardly facing element of the base portion such that a second pet shelter including the at least one downwardly facing element can be supported by the shell above the roof portion. The pet shelter can be configured for use as a pet entertainer, and also a carrier.

39 Claims, 11 Drawing Sheets

STACKABLE PET SHELTER

This application claims the benefit of U.S. Provisional Application No. 60/714,914, filed Sep. 8, 2005.

TECHNICAL FIELD

This invention relates generally to shelters for pets such as canines, felines, and the like, and more particularly, to a pet shelter on or in which the animal can rest out of contact with the ground or other surface on which the shelter is located, and which is easily portable and provides a capability for stacking two or more of the shelters to create a changeable, aesthetically pleasing, interesting and inviting protective pet environment suitable for use indoors or outdoors. The shelter is also usable as a pet entertainer and/or carrier.

BACKGROUND ART

A wide variety of pet shelters, kennels and carriers, constructed of wire, combinations of plastics or sheet metal and wire, and other materials are well-known. Some of the known pet shelters and kennels are stackable, others are multi-story. Still others include a top surface or roof structure on which a pet can sit or lay. However, none of the known pet shelters and kennels combine these features in a weather resistant, simple and convenient to use, aesthetically pleasing package, which can also be used as a portable pet carrier. Furthermore, the known pet shelters and kennels fail to provide a variety of options for attachment of accessories such as toys, scratchers and/or groomers thereto.

Therefore, what is sought is a stackable, weather resistant pet shelter, which provides one or more of the features and advantages discussed above.

SUMMARY OF THE INVENTION

What is disclosed is a stackable, weather resistant pet shelter adaptable for providing one or more of the features and advantages set forth above, which is convenient and easy to use, and aesthetically pleasing.

According to a preferred aspect of the invention, the weather resistant portable pet shelter includes a rigid shell enclosing an interior space adapted for receiving a pet, such as a dog or cat, the rigid shell including a lower base portion below the interior space having at least one external, downwardly facing element having a predetermined shape. The shell includes a side wall portion extending at least substantially around the interior space and including a door opening connecting therewith. The shell also includes an upper roof portion above the space and including a peripheral portion therearound having an external dish shaped structure. The external dish shaped structure defines an upwardly open concave region adapted for receiving and supporting a pet or a pet bed on the roof portion, the external dish shaped structure being configured for mating with and supporting the at least one downwardly facing element of the base portion such that a second pet shelter including the at least one downwardly facing element can be supported by the shell above the roof portion. The dish shaped structure can also be used for toy storage and can be covered using an optional lid, and can be used for alternative purposes, for instance, as a planter.

As a result, the pet shelter of the invention is suitable for indoor or outdoor use and can be used singly to provide both an internal resting place at least largely protected from the weather and other elements, and an elevated roof based resting place. The shelter is adapted for use also as a pet carrier, and as an entertainer. And, two or more of the shelters can be conveniently and easily stacked, to provide two inside shelters, and an outer resting place atop the upper shelter.

According to other preferred aspects of the invention, the rigid shell can be of one piece or multiple piece construction, made of a suitable material, such as a hard plastics material, which can be molded, for instance by roto molding or injection molding. Suitable connectors can also be provided for connecting together two or more of the shelters when stacked. For instance, holes can be provided through the base portion and roof portions of the shell, and adapted for receiving fasteners, such as threaded or bayonet style fasteners, for connecting and holding two of the shelters in stacked relation. Such fasteners are preferably of a weather resistant design, so as to form a sealed condition with the adjacent portion of the shell, to prevent entry of water through the holes. These holes, as well as other holes in the side wall can be utilized for connection of one or more accessories such as toys to the shelter, which can be located outside of or in the shelter, for instance, supported on rigid or resiliently flexible outwardly extending arms, springs, or the like, in the latter instance, such that pets such as cats can bat at the toys. Unused holes can be plugged with suitable removable plugs, such as the fasteners mentioned above, which can optionally sealably engage the shell for weather resistance. As another alternative, the holes can be left open for ventilation.

According to still other preferred aspects of the invention, the dish shaped structure can include a side wall structure including at least one groove, slot or hole therethrough in connection with a lower portion of the concave region and through which water can drain from the concave region. This hole can also be utilized for attachment of a variety of accessories such as toys, a scratcher, and other items to the shell, and/or to enable using the dish shaped structure as a handle for use of the shelter as a carrier for just moving the shelter. A pet bed can also be provided which is positionable in the concave region of the dish shaped structure in at least generally conforming relation thereto, and also in the interior space. A liner, which can be insulated, can also be provided for the space. The liner can be freestanding so as to be usable externally on the top of the shelter, and can have a shape at least generally conforming to the shape of the interior space, and can be collapsible into a bed shape for use in the interior space or atop the shelter.

Still further, as another preferred aspect of the invention, a door frame, hood, or door roof structure can be provided which extends around and defines at least an upper region of the door opening, the door roof structure preferably including a plurality of elongate fingers extending downwardly and sidewardly into the door opening forming a pet groomer operable for grooming or brushing a pet as it passes through the door opening and contacts the groomer. The door roof structure can also include a lip extending all or partially therearound, to direct rain which lands on the roof away from the door opening, and to facilitate attachment of other items thereto, such as a door. Also, a tubular tunnel structure can be provided extending at least substantially around the door opening and outwardly from the wall structure to define a pathway for a pet to enter and exit the door opening. This too, can be attached to the lip.

DETAILED DESCRIPTION OF THE INVENTION

Figures 1, 2, 8:
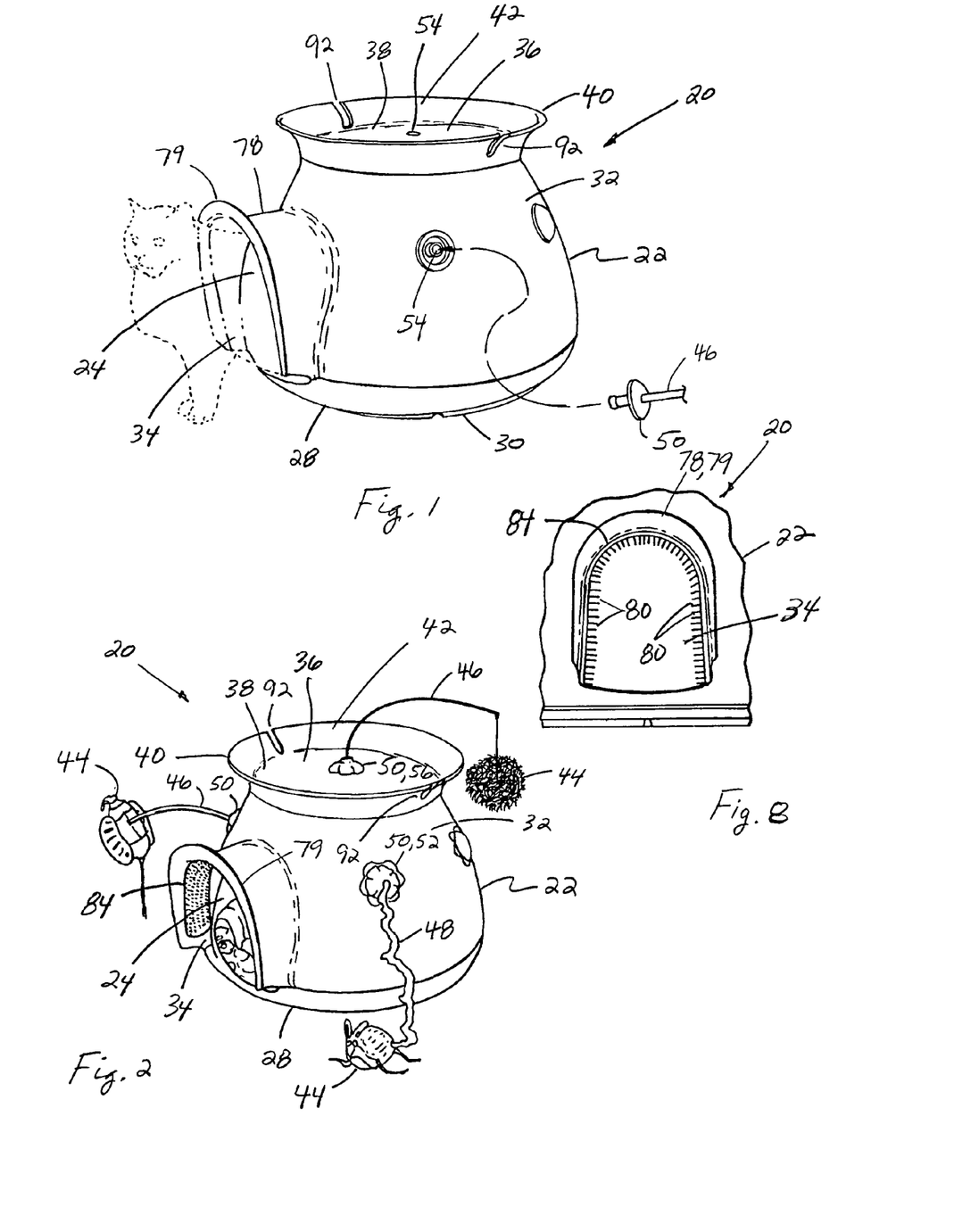
FIG. 1 is a perspective view of a stackable pet shelter of the invention, illustrating with an arrow attachment of a toy to the shelter, and in dotted lines a cat emerging from a door opening of the shelter.
FIG. 2 is another perspective view of the pet shelter of FIG. 1, illustrating several accessories attached thereto, a pet groomer around the door opening, and a pet bed on a floor of the shelter.
FIG. 8 is a fragmentary side view of a pet shelter of the invention, illustrating a door opening thereof, and a pet groomer extending around a portion of the door opening.
Figure 3:
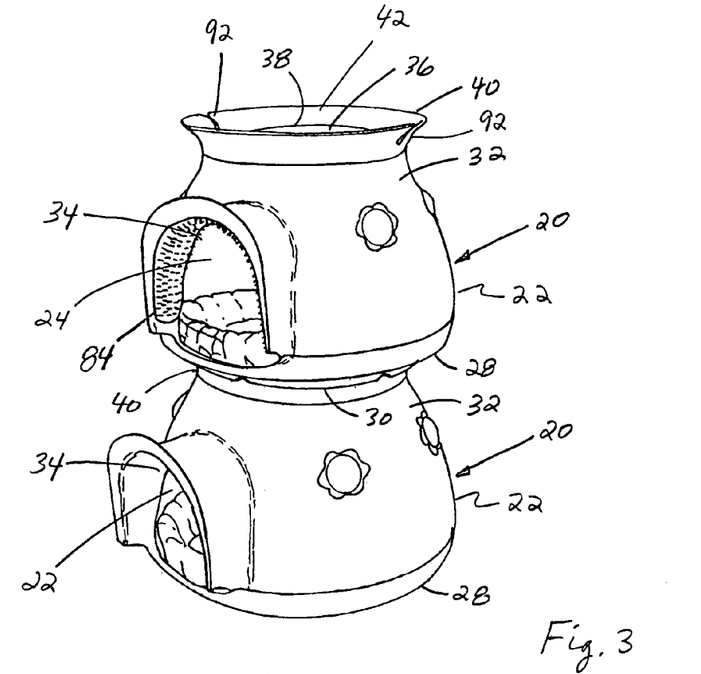
FIG. 3 is a perspective view of two pet shelters of the invention stacked one atop the other.

Referring now to the drawings, in FIGS. 1 and 2, a weather resistant, portable pet shelter 20 constructed and operable according to the teachings of the present invention, is shown. Two or more of pet shelters 20 can be stacked, as illustrated in FIG. 3. Each pet shelter 20 generally includes a rigid shell 22 enclosing an interior space 24 having a size and shape suitably adapted for receiving a pet, such as, but not limited to, a house cat 26. Rigid shell 22 includes a lower base portion 28 below the interior space 24 and having at least one external, downwardly facing support element 30 adapted for supporting shell 22 on a surface, such as a floor or the ground (not shown). Shell 22 includes a side wall portion 32 extending at least substantially around interior space 24, and including a door opening 34 connecting with space 24 and suitably sized to allow a pet to enter and exit interior space 24. Shell 22 includes an upper roof portion 36 above the space and including a peripheral portion 38 therearound having an external dish shaped structure 40 extending upwardly therefrom defining an upwardly open concave region 42 adapted for receiving and supporting a pet, either directly or on a pet bed (FIGS. 9 and 12) on roof portion 36, external dish shaped structure 40 being configured for mating with and supporting the at least one downwardly facing support element 30 of base portion 28 such that a second pet shelter 20 (FIG. 3) including the at least one downwardly facing support element 30 can be supported by the pet shelter above roof portion 36 thereof. Shell 22 is preferably roto—or injection molded, of a suitable durable and rigid plastics material.

As a result, two or more portable pet shelters 20 of the invention can be stacked to provide multiple shelters for one or more pets. In this regard, each pet shelter 20 should have a height no greater than that which can be leaped by the animal contemplated to use the pet shelter, for instance, for a typical small house pet, such as a house cat or small dog, a height of from about 10 to about 24 inches, is anticipated to be appropriate. A greater height can be used for larger animals. Thus, if the pet shelter is used singly, the pet will have the capability to leap or jump onto the roof portion of the shelter, and if used in a stacked arrangement, to at least leap or jump into the door opening of the highest shelter. A pet shelter 20 of the invention can be provided in any of a variety of shapes and configurations, one preferred shape being a rounded shape when viewed from above or below, and which has a side wall which tapers or curves convergingly toward the roof, as illustrated. This shape is preferred for aesthetic purposes and for facilitating molding. Additionally, in some instances, it may be desirable for door openings 34 of stacked shelters 22 face in different directions, and this is facilitated by the rounded shape, as it provides an unlimited number of options. This is illustrated in FIG. 3, by the offset relationship of door openings 34 of the stacked shelters.

Referring more particularly to FIG. 2, as an option, it may be desirable to provide one or more accessories or decorations in connection with shelter 20, such as toys for a pet to play with such that shelter 20 can also serve as a pet entertainer. It has been found that many pets enjoy playing with toys suspended in the air above or adjacent to their house or shelter, and/or on or in the shelter itself. Accordingly, the present invention includes one or more toys connected to the exterior thereof. In this regard, a preferred embodiment comprises a plurality of toys 44 supported on free ends of resiliently flexible arms 46, each of which arms has an opposite end mounted to either side wall portion 32 or roof portion 36 by a support element 50. Such arms can be constructed of a plastics material, or a metal such as a spring steel, for instance, a spring steel wire. Such toys can include, for instance, but are not limited to, plastic bugs, yarn balls, and the like. A toy 44 can also be connected to shelter 20 using a rigid arm, or a string or tether, as illustrated by elastic tether 48, a bungee cord or the like.

Figure 2A:
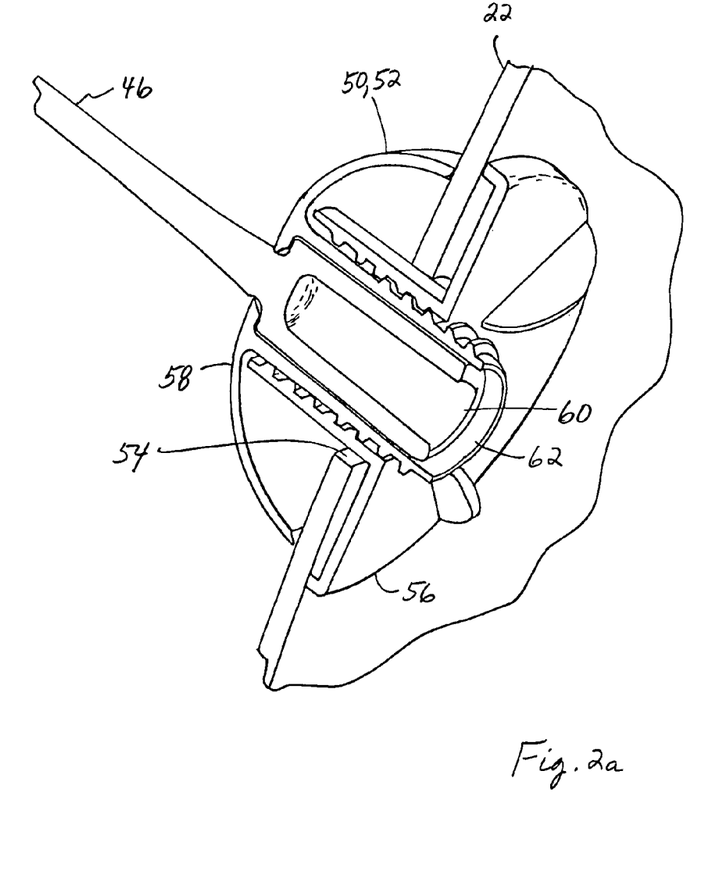
FIG. 2a is a fragmentary perspective sectional view of the pet shelter of FIG. 2, illustrating fastening of a toy to the shelter using a fastener of the invention.

Referring also to FIG. 2a, each support element 50 preferably includes an outer threaded member receivable in any of a variety of holes 54 disposed at different locations through shell 22, such as at spaced locations around side wall portion 32, and on roof portion 36. Outer threaded member 52 is threadedly engageable with an inner threaded member 56, which will typically be located within interior space 24. Here, outer threaded member 52 is depicted as being a male threaded member, and inner threaded member 52 as a matingly threaded female member, although these features could be reversed, as desired. A cup shaped outer cover portion 58 is connected to and extends around outer threaded member 52, and is oriented such that the open end of the cup is pressed against the outer surface of shell 22 when members 52 and 56 are tightly threadedly engaged, forming a sealed condition therearound, if desired. An enlarged mounting end portion 60 of a flexible arm 46, a rigid arm, or an elastic tether 48, or of a toy or other accessory itself, will be fixedly and preferably sealably received in a center hole 62 through threaded member 52. Cup shaped outer cover portion 58 and a tight fit of enlarged end portion 60 in center hole 62 will form a sealed condition adequate for preventing water leakage and drafts through hole 54, although any of holes 54 can be left open for ventilation or light transmission, as desired. Outer cover portion 58 and inner threaded member 56 are both easily manually graspable, such that an owner can install or remove a toy or accessory without tools. Also, if a toy or other accessory is not to be used with a particular hole 54, center hole 62 can be plugged. Here, it should be noted that this mounting arrangement can likewise be used for attachment of toys and other accessories within interior space 24.

Figures 4, 4A:
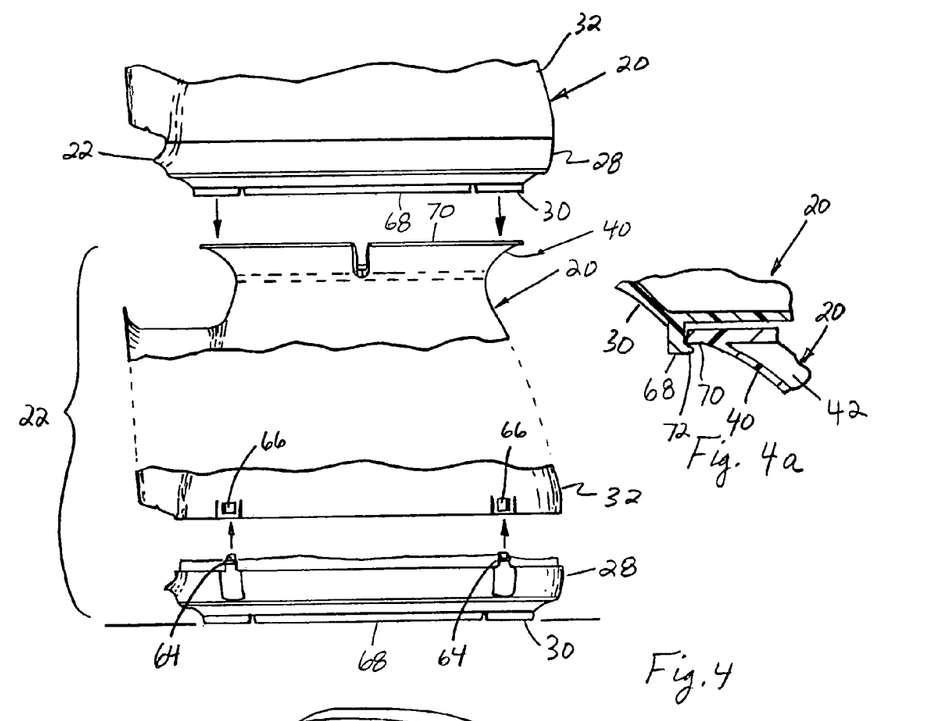
FIG. 4 is a fragmentary exploded side view of the pet shelters of FIG. 3, illustrating a mating relationship between a base portion of an upper one of the pet shelters and a dish shaped structure of a lower one of the shelters, and connection of the base portion of the lower shelter to a wall portion thereof.
FIG. 4a is a fragmentary sectional view of the shelters of FIG. 4, illustrating one manner of mating connection of the base portion of the upper shelter to an upper dish shaped structure of the lower shelter.
Figure 5:
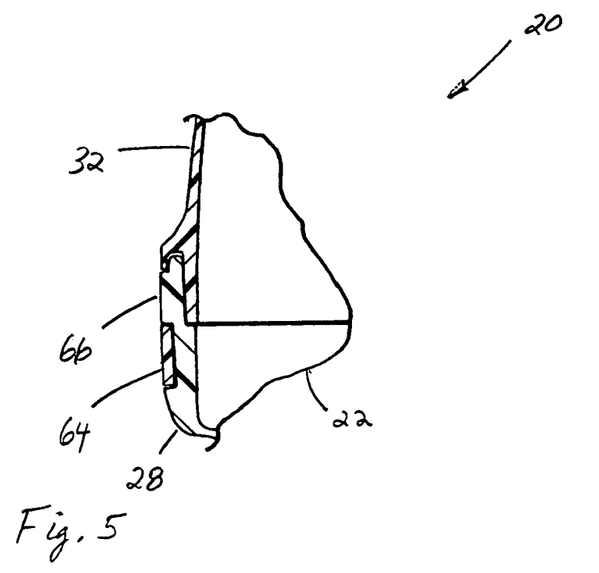
FIG. 5 is a fragmentary sectional view illustrating details of one manner of weather resistant connection of a base portion of a pet shelter to a wall portion thereof.
Figure 6:
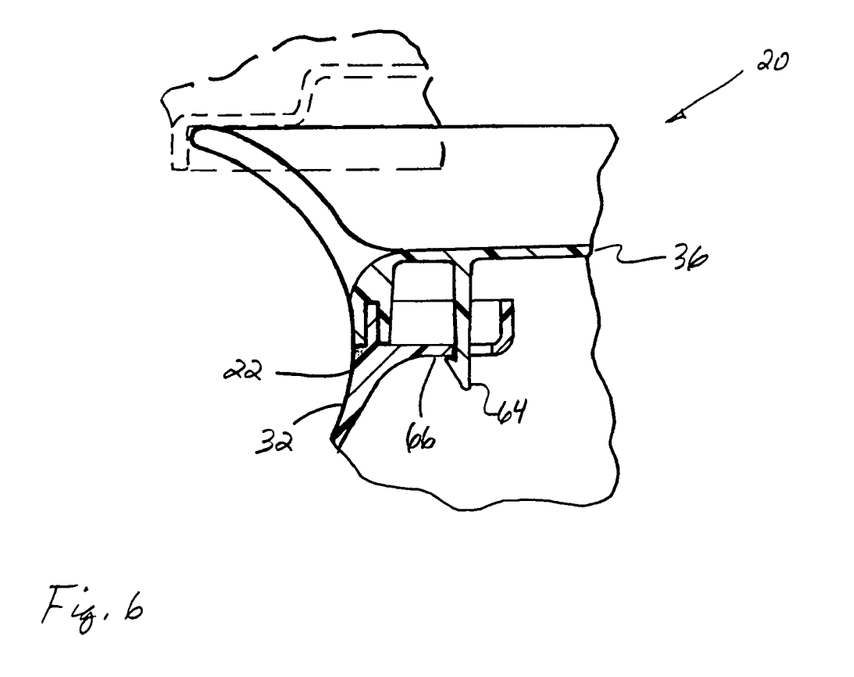
FIG. 6 is a fragmentary sectional view illustrating one manner of weather resistant connection of a dish shaped structure and roof portion of a pet shelter to a wall portion thereof.

Referring also to FIGS. 4 and 5, shell 22 of each portable pet shelter 20 can be of one or multiple piece construction, in this latter regard, for instance, wherein base portion 28 is matingly connectable with side wall portion 32 using suitable fasteners, such as clips 64 cooperatively engageable with detents 66. Side wall portion 32 can be unitary with roof portion 36, or separate therefrom, and connectable together in a suitable manner such as using clips 64 engageable with detents 66, as illustrated in FIG. 6. In each instance, it is desired for the engagement to be sufficiently tight and/or sealed so as to prevent leakage of water into the interior space of the shell for weather resistance when-the shelter is used outdoors.

Figure 7:
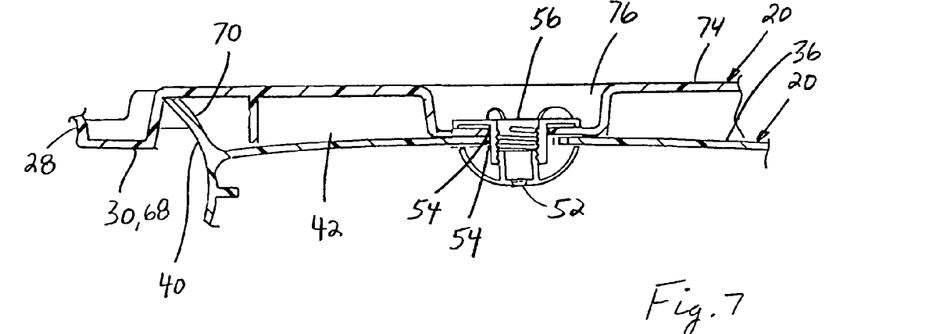
FIG. 7 is a fragmentary sectional view illustrating another manner of connection of an upper shelter to a lower shelter.

Examining FIGS. 4, 4a and 7, to facilitate stacking of pet shelters 20, the support element or elements 30 of the upper pet shelter 20 mates with the dish shaped structure 40 of the lower pet shelter. In this regard, support element 30 of each shelter 20 preferably includes a downwardly facing lower peripheral rim 68 configured for supporting the shelter on a surface, which lower peripheral rim 68 preferably has a predetermined shape and sideward extent. Dish shaped structure 40 of each shelter 20, in turn, preferably extends upwardly from and around the roof portion 36 and terminates at an upper peripheral rim 70 extending at least substantially around and defining upwardly open concave region 42, which upper peripheral rim 70 has a predetermined shape and sideward extent configured for mating with the lower peripheral rim 68 of the base. Here, rims 68 and 70 each preferably have a round shape, although other shapes can also be used. As noted above, an advantage of this round shape is that the door openings of the stacked shelters can be located so as to face in different directions as desired. Either or both of rims 68 and 70 can include interruptions, as desired or required for drainage and/or ventilation purposes, and for attachment of accessories, beds, and the like. In FIG. 4a, upper peripheral rim 70 is illustrated as having a marginally larger sideward diametrical extent compared to that of lower peripheral rim 68, and rim 68 includes a radially inwardly extending tab 72 therearound configured and adapted for engaging a lower edge of rim 70, for holding the upper shelter 20 in position in stacked relation on the lower shelter 20. Alternatively, or additionally, in FIG. 7, rim 68 is shown positioned on and in abutting relation to rim 70. Here also, base portion 28 of the upper shelter 20 is illustrated as having a hole 54 located in alignment with a hole 54 in roof portion 36 of the lower shelter 20, which holes receive threaded members 50 and 56 threadedly engageable for holding the upper shelter on the lower shelter. Further in this regard, a floor 74 of base portion 28 of upper shelter 20 located in interior space 24 thereof preferably includes a recess 76 around hole 54, which is adapted for receiving one of the threaded members 52 or 56, such that the threaded member does not extend upwardly from the floor. Thus, it is illustrated that the upper and lower shelters can be connected or fastened together in a variety of different ways, including with the door openings thereof facing different directions in offset relation.

Referring additionally to FIG. 8, door opening 34 of the shell 22 of shelter 20 preferably has a frame or hood or door roof structure 78 extending around and outwardly above at least the upper regions thereof, to provide at least some additional protection against entry of precipitation through opening 34. Items can also be attached to shell 22 using door roof structure 78. Here, door structure 78 is illustrated as including an optional outwardly flared lip 79 therearound. Lip 79 will act as a deflector for directing rain which lands on the roof structure 78 away from door opening 34, and also as a flange for attachment of articles thereto. As another desirable optional feature, door roof structure 78 can have an arched shape, and can include a plurality of parallel, closely spaced, elongate fingers 80 extending a short distance into opening 34, forming a brush or groomer 84 for grooming a pet as it moves through opening 34 into or out of the shelter. Groomer 84 can be removably mounted to door structure 78, such as by using mechanical or other fasteners such as hook and loop type fasteners or adhesives, or it could be integrally formed, or attached in any other desired manner.

Figures 9, 10, 10A:
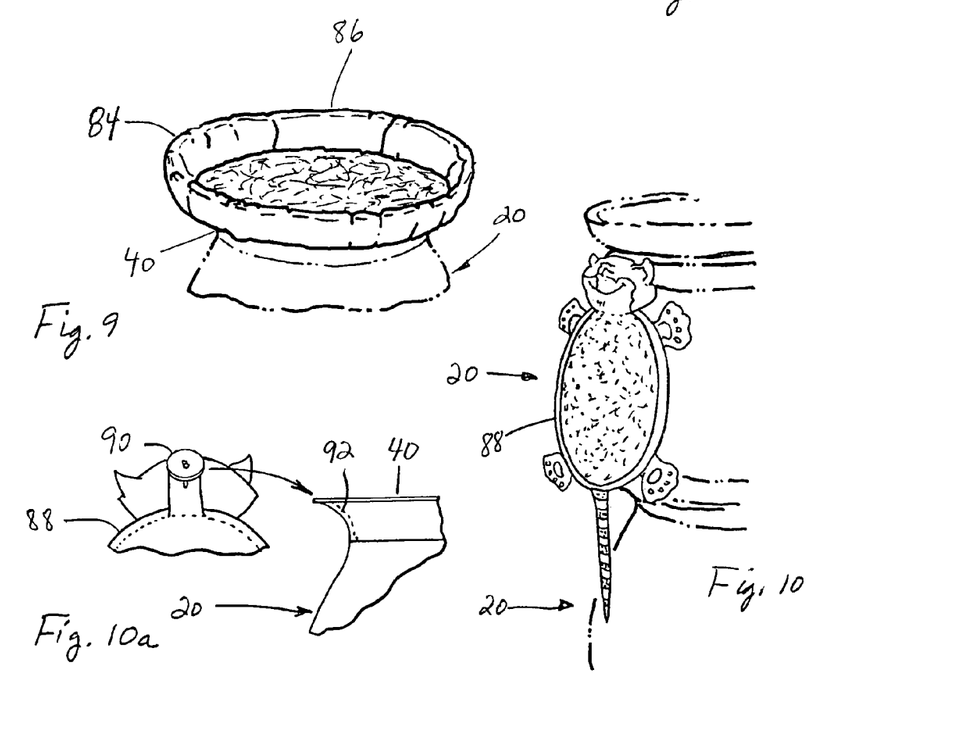
FIG. 9 illustrates an upper portion of a pet shelter of the invention in dotted lines, with a pet bed disposed on the dish shaped structure.
FIG. 10 illustrates two stacked pet shelters of the invention in dotted lines, and a pet scratcher suspended beside the shelters from the dish shaped structure of the upper shelter.
FIG. 10a is a fragmentary side view of an upper portion of the upper pet shelter and pet scratcher of FIG. 10, illustrating one manner of attachment of the pet scratcher to the dish shaped structure.

Referring also to FIG. 9, an advantage of the portable pet shelter of the invention is the-provision of a resting place on the roof. In this regard, dish shaped structure 40 of shelter 20 is illustrated as supporting and securing a pet bed 84 on the roof, upwardly extending sides 86 of the bed 84 overlaying or being contained by and/or otherwise generally conforming to the dish shaped structure, as illustrated.

FIG. 10, an accessory, which is a cat shaped scratch pad 88 including a pile, nonwoven or other fabric material surface, is illustrated as being supported beside an upper one of two stacked pet shelters 20. In FIG. 10a, a button 90 is connected to an upper end of scratch pad 88 and is slidably receivable in a slot 92 through the side of dish shaped structure 40 (FIGS. 1, 2 and 3), which slot is adapted for connection of a variety of items to shelter 20, and also provides a hole or opening for drainage of water from concave region 42. In this regard, it should be noted that roof portion 36 can be shaped so as to drain towards slot or slots 92.

Figures 11, 12, 12A:
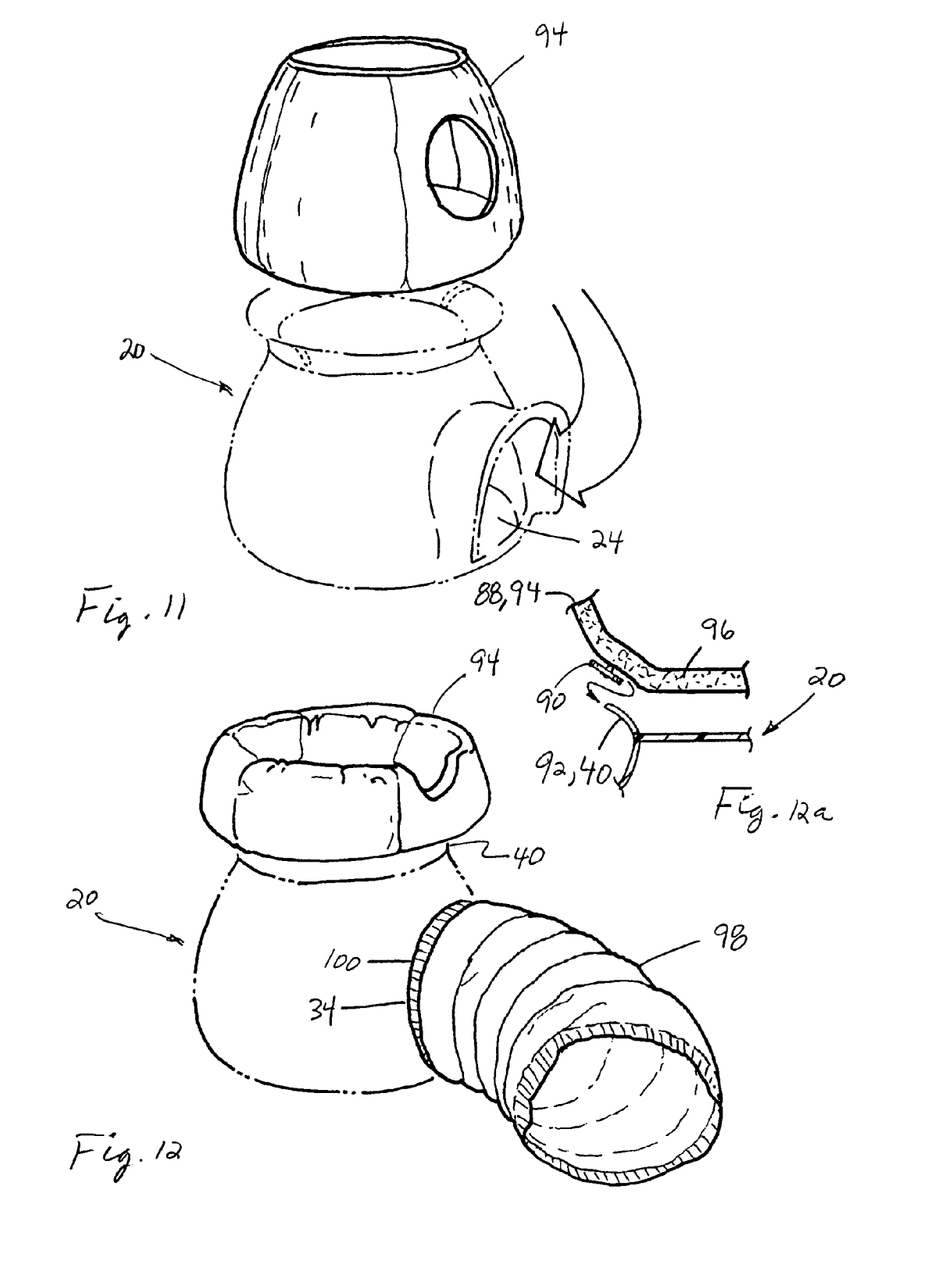
FIG. 11 illustrates a pet shelter of the invention in dotted lines, and insertion of a liner through a door opening thereof into an interior space thereof.
FIG. 12 illustrates a pet shelter of the invention in dotted lines, showing a liner collapsed as a pet bed installed on the dish shaped structure, and a tunnel installed in connection with the door opening thereof.
FIG. 12a is a fragmentary sectional view of the dish shaped structure of the pet shelter of FIG. 12, illustrating one manner of attachment of a pet bed thereto.
Figure 13:
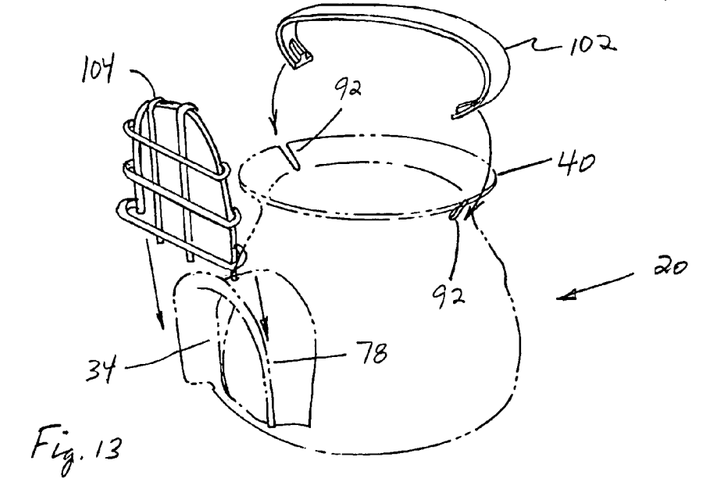
FIG. 13 illustrates and other pet shelter of the invention in dotted lines, and showing one manner of connection of a door and a handle thereto, for use as a carrier.

In FIG. 11, a liner 94 of the invention is insertable into an interior space 24 of a pet shelter 20, is illustrated. Liner 94 can be of any suitable construction, such as of fabric or foam plastics, and can be freestanding and have a shape generally conforming to that of interior space 24, to provide comfort for a pet. In FIG. 12, liner 94 is illustrated collapsed so as to be configured in a bed shape and supported in dish shaped structure 40, similarly as discussed above in relation to bed 84. Liner 94 can also be used in the collapsed state in interior space 24. FIG. 12a illustrates a suitable manner of connection of accessories, including either bed 84 or liner 94 to dish shaped structure 40 of a pet shelter 20, using a button 90 receivable in slot 92 through structure 40 as explained above. Here also, liner 94 is illustrated as including insulation 96 which also provides padding for improved pet comfort. Also in FIG. 12, a tubular tunnel 98 is illustrated in connection with door opening 34 of shelter 20, tunnel 98 being affixable around door roof structure 78 (FIG. 1) in any suitable manner, such as by using an elastic or drawstring collar 100 held in position by lip 79 around structure 78.

Figure 14:
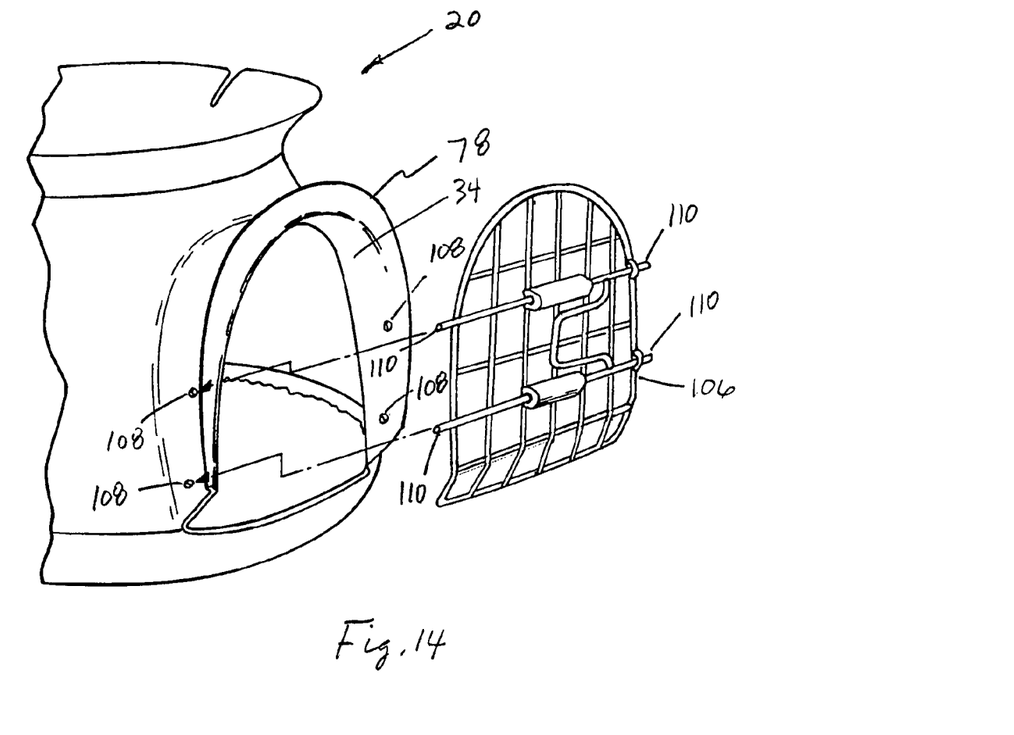
FIG. 14 is a fragmentary perspective view of a pet shelter of the invention, illustrating another manner of connection of a door.
Figure 15:
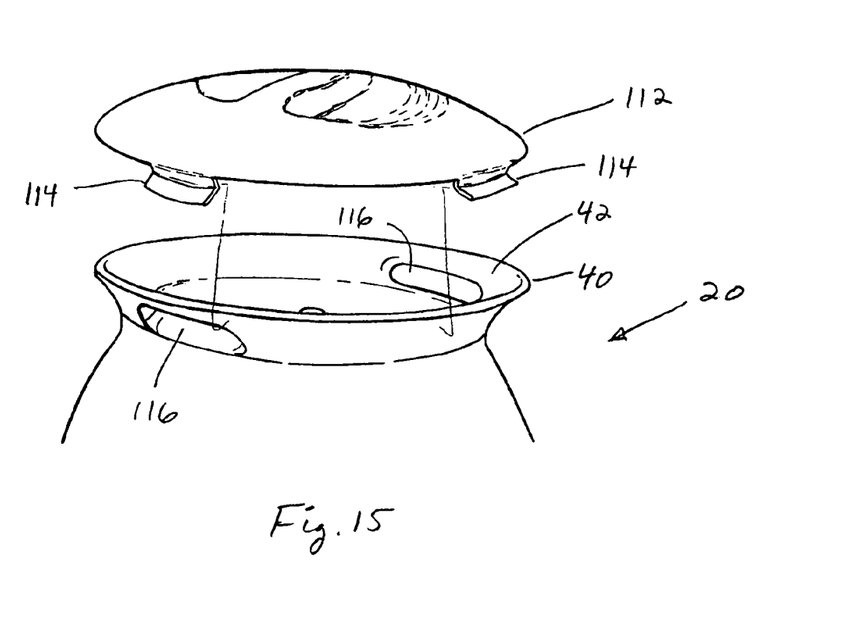
FIG. 15 is a fragmentary perspective view of a pet shelter of the invention, illustrating connection of a lid to the dish shaped structure thereof.
Figure 16:
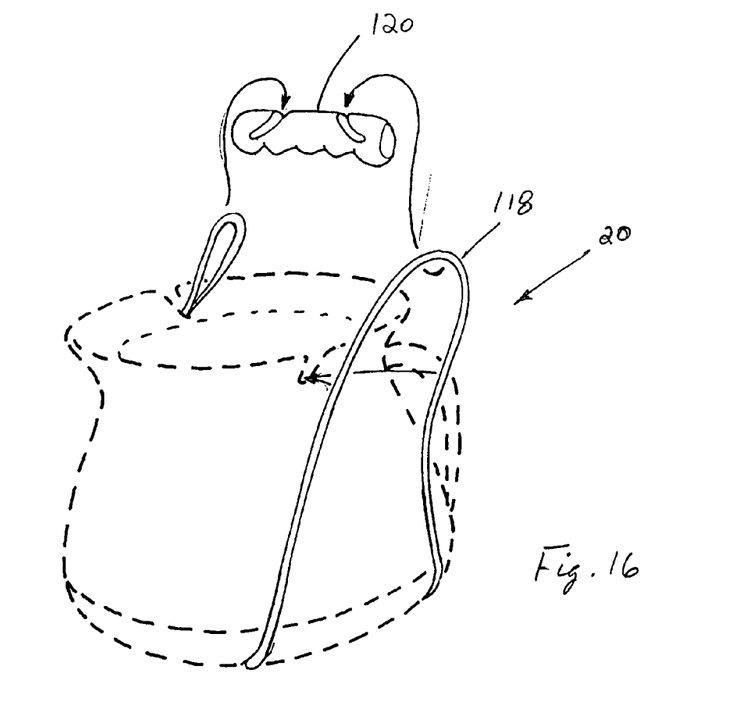
FIG. 16 illustrates a pet shelter of the invention in dotted lines, and one manner of connection of a handle thereto.
Figure 17:
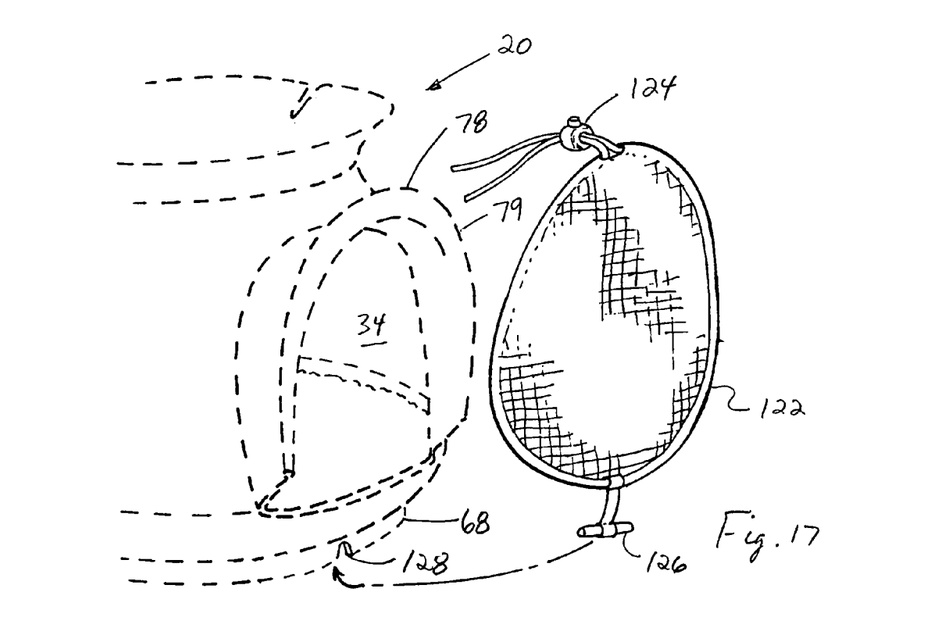
FIG. 17 illustrates a pet shelter of the invention in dotted lines, and another manner of connection of a door over the door opening thereof.

Referring also to FIGS. 13, 14, 15, 16 and 17, additional accessories for use with a portable animal shelter of the invention, such as shelter 20, are illustrated. For instance, in FIG. 13, a handle 102 is illustrated as being connectable to dish shaped structure 40, for instance, by engagement with grooves 92, to better enable using shelter 20 as a pet carrier. A door 104 is illustrated as being slidable over door roof structure 78 to cover door opening 34 of shelter 20, which also facilitates use as a carrier. In FIG. 14, an alternative door 106 is connectable in covering relation to door opening 34, by insertion of rods 110 into holes 108 at predetermined locations in the sides of door roof structure 78. FIG. 15 illustrates a cover 112 mountable to dish shaped structure 40 in covering relation to concave region 42, for instance, using side clips 114. Cover 112 can be used in conjunction with handle 102. Here also, dish shaped structure 40 is illustrated as having holes 116 therethrough at spaced locations therearound, for providing drainage, and also to enable easily grasping dish shaped structure 44 for lifting or carrying shelter 20. In FIG. 16, a carrying strap 118 is illustrated wrapped beneath pet shelter 20 and engageable with a handle 120, strap 118 being receivable in grooves or cuts in lower peripheral rim 68 (FIG. 1) for holding strap 118 in position, again, to facilitate use of shelter 20 as a pet carrier. And, FIG. 17 illustrates a screen door 122 securable in covering relation to door opening 34 by connection to door roof portion 78 by a drawstring 124 positional will behind lip 79, and a toggle 126 receivable in a cut or groove 128 in rim 68.

Figure 18:
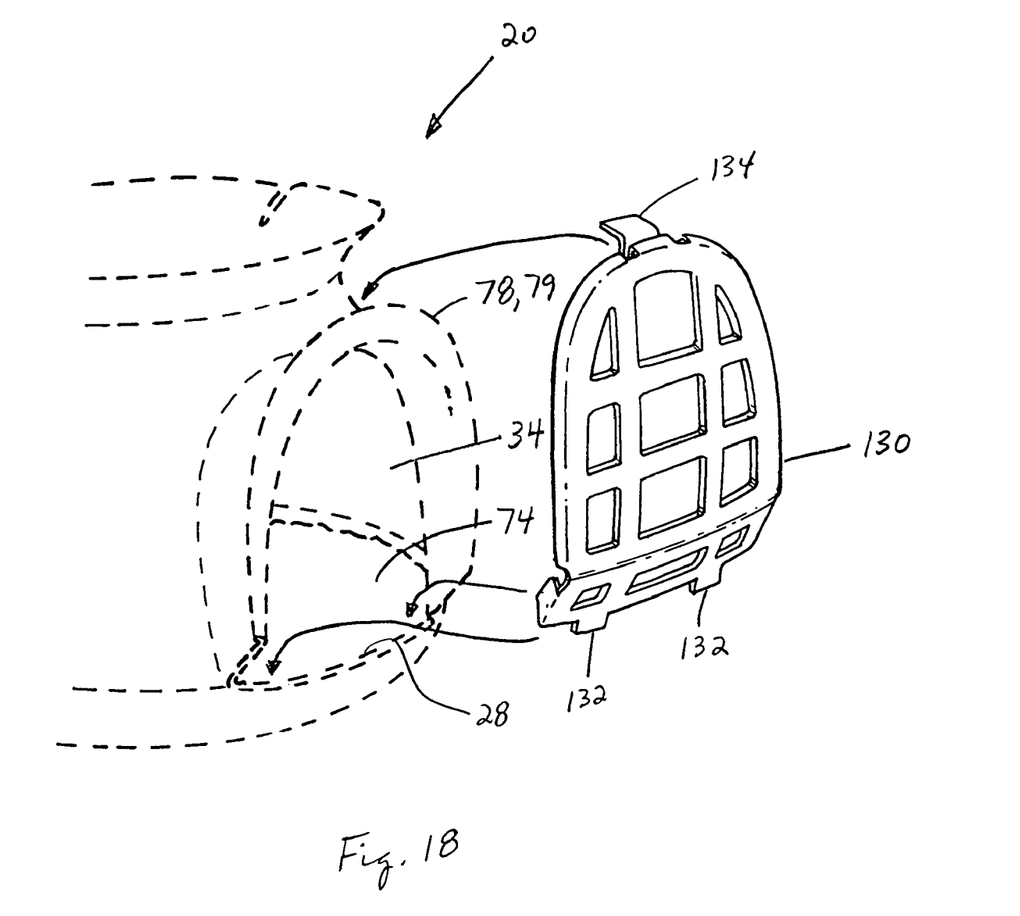
FIG. 18 illustrates a pet shelter of the invention in dotted lines, and another manner of connection of a door over the door opening thereof.

In FIG. 18, yet another door 130 of the invention is shown attachable to door roof structure 78 and lower base portion 28, in covering relation to door opening 34. Here, door 130 includes tabs 132 insertable into suitable receivers in floor 74 adjacent the edge of base portion 28, and a clip 134 which is received behind lip 79 of door roof structure 78, for securing in position. Again, this facilitates usage of the shelter as a carrier. Door 130, as well as doors 104 and 106 can be fabricated from suitable material, such as metal and/or plastics, and can have any desired number of openings therein, or can be completely solid.

Figure 19:
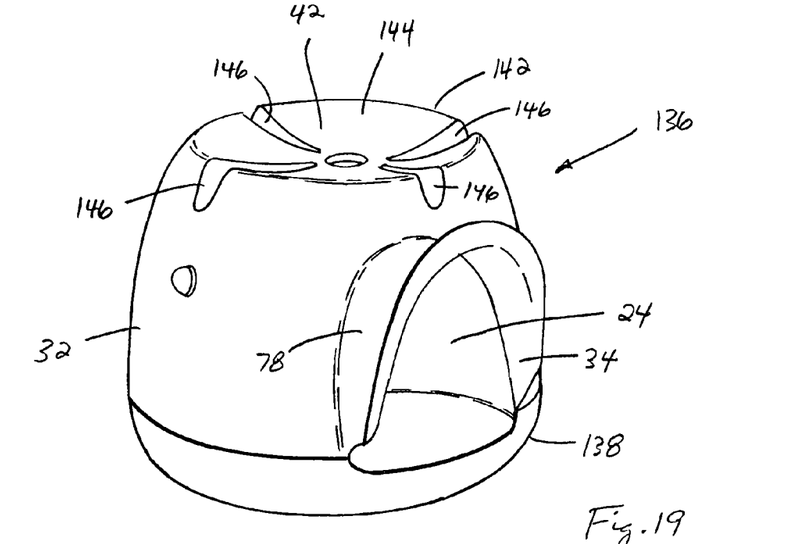
FIG. 19 is a perspective view of another stackable pet shelter of the invention.
Figure 20:
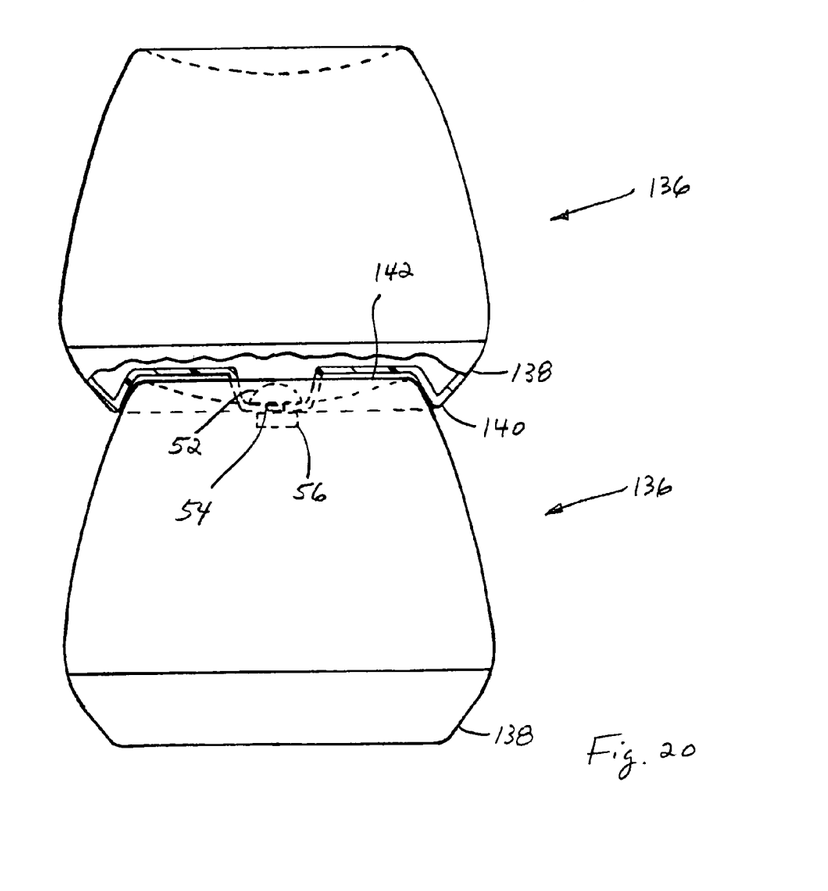
FIG. 20 is a perspective view of two pet shelters of FIG. 19 stacked one atop the other.

In FIGS. 19 and 20, another embodiment of a portable pet shelter 136 constructed and operable according to the teachings of the present invention, is shown, like parts of shelter 136 and shelter 20 being identified by like numerals. Shelter 136 differs from shelter 20 primarily in the provision of different mating elements on the bottom and top ends thereof, including a lower base portion 138 having a downwardly open concave support element 140 on which shelter 136 is supportable, and which is configured and adapted for matingly cooperatively receiving a dish shaped structure 142 on a roof portion 144 of the shelter. Again, dish shaped structure 142, like dish shaped structure 40 of shelter 20, forms a concave region 42 adapted for supporting a pet thereon, and on which a bed, such as bed 84, or a liner 94, can be placed. Grooves 146 provide drainage, and also can be utilized for attachment of accessories. Shelter 136 includes a side wall portion 32 which, along with dish shaped structure 142, can include one or more holes therein, such as holes 54 discussed above, for attachment of accessories and decorations thereto. Base portion 138, side wall portion 32 and roof 42 enclose and define an interior space 24 adapted for receiving and holding a pet, and a door opening 34 connects with interior space 24, as before. A door roof structure 78 extends around the upper region of door opening 34 and can be utilized in the above explained manner, for attachment of a door, tunnel, or the like to the shelter. Referring in particular to FIG. 20, two shelters 136 are shown stacked, with the dish shaped structure 142 of the lowermost shelter cooperatively and matingly received in concave support element 140 of lower base portion 138. To hold the shelters 136 together, suitable fasteners or other connectors can be used, such as threaded members 52 and 56 extending through aligned holes 54 in the shelters.

Figure 21:
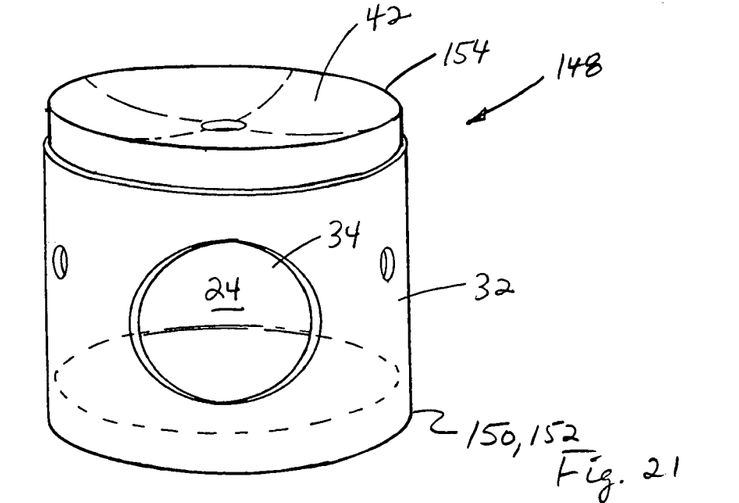
FIG. 21 is a perspective view of still another stackable pet shelter of the invention.
Figure 22:
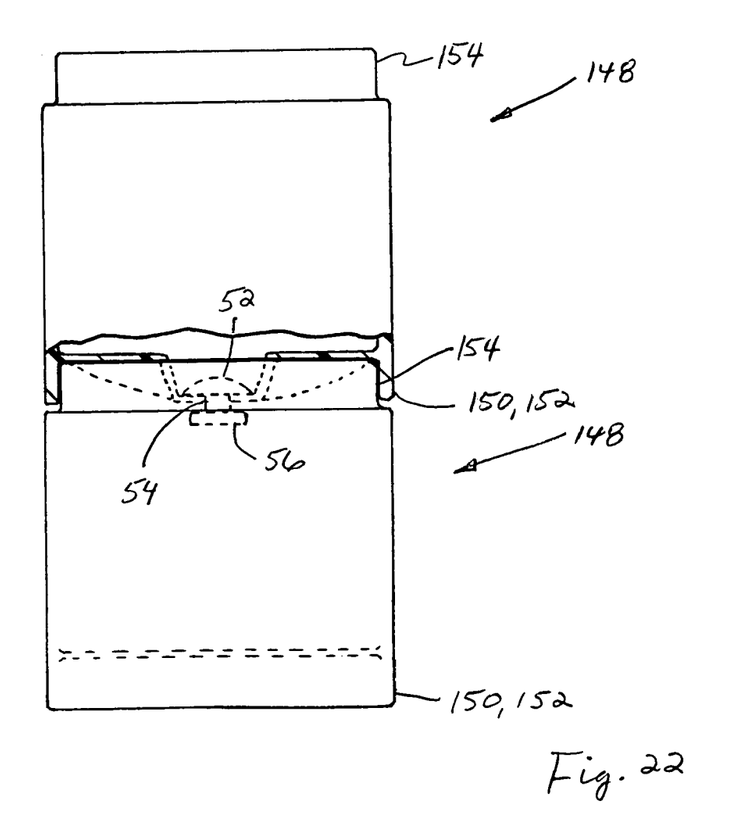
FIG. 22 is a perspective view of two pet shelters of FIG. 21 stacked one atop the other.

In FIGS. 21 and 22, still another embodiment of a portable pet shelter 148 constructed and operable according to the teachings of the present invention, is shown, like parts of shelter 148 and shelters 136 and 20 being identified by like numerals. Shelter 148 differs from shelters 20 and 136 primarily in overall shape, and by the provision of different mating elements on the bottom and top ends thereof, including a lower base portion 150 having a downwardly open concave support element 152 on which shelter 148 is supportable, and which is configured and adapted for matingly cooperatively receiving a dish shaped structure 154 on a roof portion 156 of the shelter. Again, dish shaped structure 154, like dish shaped structure 40 of shelter 20 and dish shaped structure 142 of shelter 136, forms a concave region 42 adapted for supporting a pet thereon, and on which a bed, such as bed 84, or a liner 94, can be placed. Shelter 136 includes a side wall portion 32 which, along with dish shaped structure 154, can include one or more holes therein, such as holes 54 discussed above, for attachment of accessories and decorations thereto. Base portion 150, side wall portion 32 and roof 156 enclose and define an interior space 24 adapted for receiving and holding a pet, and a door opening 34 connects with interior space 24, as before. A door roof structure (not shown) can extend around the upper region of door opening 34 and can be utilized in the above explained manner, for attachment of a door, tunnel, or the like to the shelter. Referring in particular to FIG. 22, two shelters 148 are shown stacked, with the dish shaped structure 154 of the lowermost shelter cooperatively and matingly received in concave support element 152 of lower base portion 148. To hold the shelters 148 together, suitable fasteners or other connectors can be used, such as threaded members 52 and 56 extending through aligned holes 54 in the shelters.

Here, it should be noted that it is contemplated that pet shelters of the invention, including shelters 20, 136 and 148 illustrated, can be provided in a variety of different shapes and sizes, including, but not limited to, square, rectangular, trapezoidal, hexagonal, and other multi-sided shapes. Additionally, any of the accessories and toys discussed above can be used with any of the pet shelters 20, 136 and 148. Still further, it should be recognized and understood that the pet shelters of the invention can be configured to serve as a pet entertainer and/or pet carrier.

It will be understood that changes in the details, materials, steps, and arrangements of parts which have been described and illustrated-to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A weather resistant portable pet shelter, comprising:
   a base having an external, downwardly facing element having a predetermined shape and sideward extent, and an upwardly facing floor for supporting a pet thereon;
   a roof disposed above the floor and defining an interior space therebetween adapted for receiving a pet;
   a wall structure connected to the base and the roof and extending around and enclosing the interior space, the wall structure including a door opening connecting with the interior space through which a pet can enter and exit the interior space; and
   wherein the roof includes an external, generally dish shaped structure defining an upwardly open concave region, the dish shaped structure having a predetermined shape and sideward extent configured for mating with the downwardly facing element of the base such that a second pet shelter including a duplicate of the downwardly facing element of the base can be supported on the dish shaped structure.

2. The portable pet shelter of claim 1, further comprising a second pet shelter including the duplicate of the downwardly facing element.

3. The portable pet shelter of claim 2, wherein the second pet shelter is supported on the dish shaped structure.

4. The portable pet shelter of claim 3, wherein the second pet shelter is connected to the dish shaped structure.

5. The portable pet shelter of claim 4, wherein the second pet shelter is connected to the dish shaped structure by at least one removable fastener.

6. The portable pet shelter of claim 1, further comprising at least one accessory supported on the shelter.

7. The portable pet shelter of claim 6, wherein at least the wall structure includes a plurality of holes therein, each of the holes being adapted for receiving a removable plug or an element for attachment of the accessory to the shelter.

8. The portable pet shelter of claim 1, wherein the dish shaped structure comprises a side wall structure extending upwardly to the upper peripheral rim, the side wall structure including at least one hole therethrough in connection with a lower portion of the concave region and through which water can drain from the concave region.

9. The portable pet shelter of claim 1, wherein the dish shaped structure comprises a side wall structure extending upwardly to an upper peripheral rim, the side wall structure including at least one handle.

10. The portable pet shelter of claim 1, further comprising a pet bed positionable in the concave region of the dish shaped structure in at least generally conforming relation thereto.

11. The portable pet shelter of claim 1, further comprising a liner removably positionable within the interior space in at least generally conforming relation to the floor and interior surfaces of the wall structure extending around the interior space.

12. The portable pet shelter of claim 11, wherein the inner liner is insulated.

13. The portable pet shelter of claim 1, including a door roof structure extending around and defining at least an upper region of the door opening, the door roof structure including a plurality of elongate fingers extending downwardly and sidewardly into the door opening forming a pet groomer operable for grooming a pet as it passes through the door opening and contacts the groomer.

14. The portable pet shelter of claim 1, including a tubular tunnel structure extending at least substantially around the door opening and outwardly from the wall structure defining a pathway for a pet to enter and exit the door opening.

15. The portable pet shelter of claim 1, wherein the base, the wall structure and the interior space have a generally rounded shape when viewed from above or below.

16. The portable pet shelter of claim 1, further comprising a lid connectable to the dish shaped structure in covering relation to the concave region.

17. The portable pet shelter of claim 1, further comprising a scratcher connectable to the dish shaped structure beside the wall structure.

18. The portable pet shelter of claim 1, further comprising a door positionable and at least covering relation to the door opening and securable in position by connection to the lower peripheral rim of the base.

19. A weather resistant portable pet shelter, comprising:
    a rigid shell enclosing an interior space, the rigid shell including a lower base portion below the interior space having at least one external, downwardly facing element having a predetermined shape, a side wall portion extending at least substantially around the interior space and including a door opening connecting therewith, and an upper roof portion above the space and including a peripheral portion therearound having an external dish shaped structure defining an upwardly open concave region adapted for receiving and supporting a pet or a pet bed on the roof portion, the external dish shaped structure being configured for mating with and supporting the at least one downwardly facing element of the base portion such that a second pet shelter including the at least one downwardly facing element can be supported by the shell above the roof portion.

20. The portable pet shelter of claim 19, further comprising a second pet shelter including the base portion having the at least one downwardly facing element, the side wall portion, and the roof portion.

21. The portable pet shelter of claim 20, further comprising at least one fastening element securing the second pet shelter on the dish shaped structure.

22. The portable pet shelter of claim 21, wherein the at least one fastening element comprises fasteners extending through central portions of the pet shelters.

23. The portable pet shelter of claim 19, further comprising at least one accessory supported in connection with the shell.

24. The portable pet shelter of claim 23, wherein the shell includes a plurality of holes therein, each of the holes being adapted for receiving a removable plug or a support element for the accessory.

25. The portable pet shelter of claim 19, wherein the dish shaped structure comprises a side wall structure extending upwardly to an upper peripheral rim extending at least substantially around the concave region, the side wall structure including at least one hole therethrough in connection with a lower portion of the concave region and through which water can drain from the concave region.

26. The portable pet shelter of claim 19, wherein the dish shaped structure comprises a side wall structure extending upwardly to an upper peripheral rim extending around the concave region and including at least one handle.

27. The portable pet shelter of claim 19, further comprising a pet bed positionable in the concave region of the dish shaped structure in at least generally conforming relation thereto.

28. The portable pet shelter of claim 19, further comprising a liner removably positionable within the interior space.

29. The portable pet shelter of claim 28, wherein the liner is insulated.

30. The portable pet shelter of claim 19, including a door roof structure extending around and defining at least an upper region of the door opening, the door roof structure including a plurality of elongate fingers extending downwardly and sidewardly into the door opening forming a pet groomer operable for grooming a pet as it passes through the door opening and contacts the groomer.

31. The portable pet shelter of claim 19, including a tubular tunnel structure extending at least substantially around the door opening and outwardly from the wall structure defining a pathway for a pet to enter and exit the door opening.

32. The portable pet shelter of claim 19, wherein the external dish shaped structure and the at least one downwardly facing element of the base portion are shaped so as to allow a second pet shelter including the at least one downwardly facing support element to be supported by the shell above the roof portion in a plurality of sidewardly facing orientations relative to the pet shelter.

33. The portable pet shelter of claim 19, further comprising a lid connectable to the dish shaped structure in covering relation to the concave region.

34. The portable pet shelter of claim 19, further comprising a scratcher connectable to the dish shaped structure beside the side wall portion of the shell.

35. The portable pet shelter of claim 19, further comprising a door positionable in at least covering relation to the door opening and securable in position by connection to the lower base portion.

36. A weather resistant portable pet shelter, comprising:
a first rigid molded plastics shell enclosing an interior space, the rigid shell including an external base portion configured for supporting the shell, a side wall portion extending upwardly from the base portion and at least substantially around the interior space and including a door opening connecting therewith, and an upper roof portion covering the space and including an external upper dish shaped structure extending at least substantially around and defining a concave region configured for supporting a pet or a pet bed on the roof portion; and
a second rigid molded plastics shell enclosing an interior space, the second rigid shell including an external base portion including at least one structural element matingly engageable with the dish shaped structure of the first rigid molded plastics shell so as to be mountable thereon.

37. The portable pet shelter of claim 36, further comprising at least one element securing the base portion of the second shell on the dish shaped structure of the first shell.

38. The portable pet shelter of claim 37, wherein the at least one element comprises a fastener extending through central portions of the roof portion of the first shell and the base portion of the second shell.

39. The portable pet shelter of claim 36, further comprising at least one accessory supported in connection with at least one of the shells.

* * * * *